Oct. 16, 1962     H. F. GORHAM     3,058,254
LINE GUIDE FOR FISHING ROD
Filed Jan. 19, 1960

INVENTOR.
HAROLD F. GORHAM
BY Fulwider, Mattingly
& Huntley
ATTORNEYS 3,058,254
LINE GUIDE FOR FISHING ROD
Harold F. Gorham, National City, Calif., assignor to Gorham Universal Manufacturing Company, Inc., San Diego, Calif., a corporation of California
Filed Jan. 19, 1960, Ser. No. 3,449
7 Claims. (Cl. 43—24)

The present invention relates to a line guide for a fishing rod and more particularly to a line guide for a rod equipped with either a standard type of reel which normally is carried above the rod or a "spinner" type of reel which is normally carried below the rod.

In carrying out the present invention, a pulley support carries a pulley and includes a guide portion which cooperates with the pulley to provide a closed guide for the fishing line. The pulley support is pivotally mounted on the rod so that the pulley and guide remain in the same relative position with one another although the rod is inverted, i.e., the pulley can be maintained below the guide although the rod is inverted. Viewed in another manner, it may be said that the pulley support can be inverted with respect to the rod.

The advantages will be apparent from the following description, reference being had to the accompanying drawings wherein a preferred embodiment of the invention is illustrated.

Figure 3:
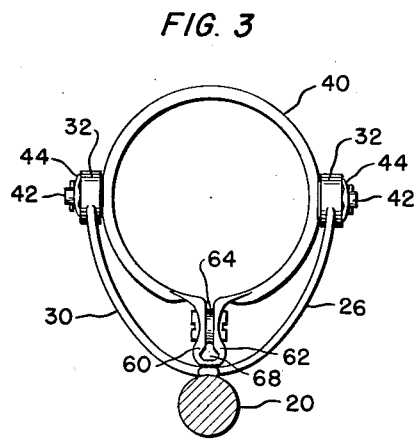
FIG. 3 is a view looking in the direction of arrow 3 of FIG. 1, showing the fishing pole in cross-section.
Figures 4, 5:
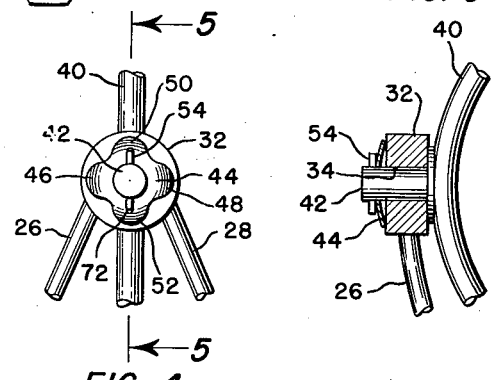
FIG. 4 is a fragmentary view showing the pivotal connection of the pulley support, but on a larger scale.
FIG. 5 is a sectional view of the pulley support bearing, the section being taken substantially along line 5—5 of FIG. 4.

Referring more in detail to the drawings, the fishing pole is shown at 20 and it carries the guide shown generally at 22. This guide includes a base 24 which is secured to the fishing rod in any suitable manner as by encircling it and the rod with thread (not shown). Four arms extend upwardly and diverge outwardly from the base 24. Two of these arms 26 and 28 extend to the right as viewed in FIG. 3, and another pair of arms extend to the left, one of which is shown in FIG. 3 at 30. The other arm, which extends to the left, is similar to arm 28. Each pair of arms carries a bearing 32 having aligned holes 34.

A pulley support 40 is carried by these bearings 32. Here the pulley support is shown as comprising substantially a loop for receiving the fishing line. This loop carries two axially aligned shafts 42 which are received in the bearing openings 34. A leaf spring 44 has opposite ears 46 and 48 suitably attached to the outer face of the bearing 32 (such attachment may be by soldering) and is provided with two ears 50 and 52 which resiliently bear against the outer face of the bearing 32. A pin 54 extends through a hole in the spindle or shaft 42 and the hole in the shaft, and the pin is so disposed as to maintain the ears 50 and 52 in yielding relationship with the outer face of the bearing 32. While such structure has been described with respect to one of the shafts 42, such spring 44 may also be applied to the other shaft.

The pulley support 40 is provided with two spaced parallel and outwardly bowed walls 60 and 62 which carry a hub and which hub in turn carries a pulley 64. These spaced walls 60 and 62 extend longitudinally of the rod 20. The periphery of the pulley and the pulley support 40 form a closed loop for receiving the fishing line. This fishing line is indicated at 70 in FIG. 1.

Figure 1:
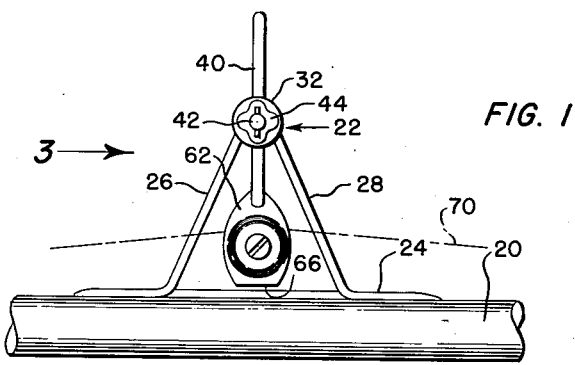
FIG. 1 is a fragmentary view of a fishing rod showing the improved line guide attached thereto, the line guide being in the position for use with a standard type reel.
Figure 2:
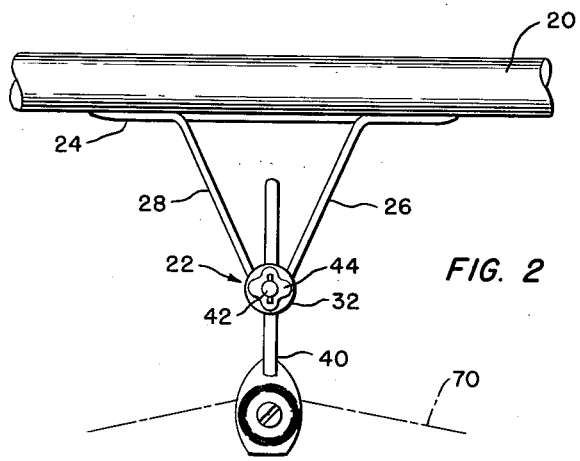
FIG. 2 is a view similar to FIG. 1 but showing the line guide in a position in which a spinner type reel is employed.

When the fishing pole is to be used with a standard type of reel in which the reel is disposed on the upper side of the rod, the guide support is in the position shown in FIG. 1. It will be observed that the fishing line 70 rides upon the pulley 64. When the fishing pole is to be used with a type of reel which is suspended from the rod, for example a spinner type of reel, the guide support is turned 180 degrees with respect to the base 24 and arms 26, 28 and 30 and will be in the position as shown in FIG. 2 when the pole is inverted. Here again the line 70 passes through the loop 40 and is adapted to rest upon the pulley 64.

Thus it will be seen that in either position the line is guided and rides on the pulley 64. The guide support 40 can be yieldingly maintained in either position and preferably a groove 72 is formed in the leaf spring 44 for receiving the pin 54, the tension of the spring 44 normally tending to maintain the pin within the groove 72 yet permitting the relative movement between the pulley support and the base by compressing the springs 44. The tension of the springs 44 is such that this pulley support can be moved from one position to the other by manual manipulation.

The pulley and the support therefor are more clearly shown in my application filed on even date herewith and entitled "Fishing Rod Tips" (Docket SDM 1238).

From the foregoing it is apparent that there has been provided a loop which is materially greater in width than the periphery of the pulley which forms part of the loop. Thus the line can move freely through the loop, which free movement is highly desirable, as for example where casting the line outwardly.

While the form of embodiment herein shown and described constitutes a preferred form, it is to be understood that other forms may be adopted falling within the scope of the claims that follow.

I claim:

1. In combination, a fishing rod; a line guide for the fishing rod comprising a base attached to the rod intermediate the ends of the rod; means forming a pulley support; a pulley rotatably supported by the pulley support, the periphery of the pulley and the pulley support cooperating to form a closed loop guide, above the pulley, for a fishing line the interior guiding surface for the fishing line being materially greater in width than the width of the periphery of the pulley; and a pivot on the base having its axis disposed at right angles with respect to the rod for pivotally supporting the pulley support on the base on an axis disposed parallel to and spaced from the axis of the pulley for inverting the pulley support and pulley with respect to the base.

2. In combination, a fishing rod; a line guide for the fishing rod comprising a base attached to the rod intermediate the ends of the rod; means forming a pulley support; a pulley rotatably supported by the pulley support, the periphery of the pulley and the pulley support cooperating to form a closed loop guide, above the pulley, for a fishing line the interior guiding surface for the fishing line being materially greater in width than the width of the periphery of the pulley; a pivot on the base having its axis disposed at right angles with respect to the rod for pivotally supporting the pulley support on the base on an axis disposed parallel to and spaced from the axis of the pulley for inverting the pulley support and pulley with respect to the base; and resilient means for restraining pivotal movement of the pulley support.

3. In combination, a fishing rod; a line guide for the fishing rod comprising a base attached to the rod intermediate the ends of the rod and including a pair of arms on the base diverging outwardly of one another; means forming a pulley support; a pulley rotatably supported by the pulley support, the periphery of the pulley and the pulley support cooperating to form a closed loop guide, above the pulley, for a fishing line the interior guiding surface for the fishing line being materially greater in width than the width of the periphery of the pulley; and a pivot on the base having its axis disposed at right angles with respect to the rod for pivotally supporting the pulley support on the arms on an axis disposed parallel to and spaced from the axis of the pulley for inverting the pulley support and pulley with respect to the base.

4. In combination, a fishing rod; a line guide for the fishing rod comprising a base attached to the rod intermediate the ends of the rod and including a pair of arms on the base diverging outwardly of one another; means forming a pulley support; a pulley rotatably supported by the pulley support, the periphery of the pulley and the pulley support cooperating to form a closed loop guide, above the pulley, for a fishing line the interior guiding surface for the fishing line being materially greater in width than the width of the periphery of the pulley; a pivot on the base having its axis disposed at right angles with respect to the rod for pivotally supporting the pulley support on the arms on an axis disposed parallel to and spaced from the axis of the pulley for inverting the pulley support and pulley with respect to the base; and resilient means for restraining pivotal movement of the pulley support.

5. In combination, a fishing rod; a line guide for the fishing rod comprising a base attached to the rod intermediate the ends of the rod; means forming a pulley support; a pulley rotatably supported by the pulley support, the periphery of the pulley and the pulley support cooperating to form a closed loop guide, above the pulley, for a fishing line the interior guiding surface for the fishing line being materially greater than the width of the periphery of the pulley; and a pivot on the base having its axis disposed at right angles with respect to the rod for pivotally supporting the pulley support on the base on an axis disposed parallel to and spaced from the axis of the pulley for inverting the pulley support and pulley with respect to the base; and means for resiliently restraining pivotal movement of the pulley support.

6. In combination, a fishing rod; a line guide for the fishing rod comprising a base attached to the rod intermediate the ends of the rod including a pair of arms on the base diverging outwardly of one another; means forming a pulley support; a pulley rotatably supported by the pulley support, the periphery of the pulley and the pulley support cooperating to form a closed loop guide, above the pulley, for a fishing line the interior guiding surface for the fishing line being materially greater in width than the width of the periphery of the pulley; and a pivot on the base having its axis disposed at right angles with respect to the rod for pivotally supporting the pulley support on the arms on an axis disposed parallel to and spaced from the axis of the pulley for inverting the pulley support and pulley with respect to the base; and means for resiliently restraining pivotal movement of the pulley support.

7. In combination, a fishing rod; a line guide for the fishing rod comprising a base attached to the rod; a pair of arms extending laterally of the rod; shafts carried by the arms remote from the rod, the shafts being aligned, the axis of the shafts being disposed at right angles with respect to the rod; a loop pivotally supported by said shafts, said loop having an outwardly bowed portion disposed centrally of the shafts to define a slot therebetween in communication with the interior of the loop; and a rotatable pulley disposed between and carried by the bowed portion, said loop being movable about said shafts whereby the pulley may be adjustably positioned adjacent to or spaced from the rod.

References Cited in the file of this patent

UNITED STATES PATENTS

| | | |
|---|---|---|
| 2,081,467 | Tompkins | May 25, 1937 |
| 2,324,353 | Berry | July 13, 1943 |
| 2,360,802 | Stenz | Oct. 17, 1944 |
| 2,863,252 | Hettinger | Dec. 9, 1958 |
| 2,996,774 | Sutton | Aug. 22, 1961 |